United States Patent [19]

Abramson et al.

[11] Patent Number: 5,383,370
[45] Date of Patent: Jan. 24, 1995

[54] DEVICE FOR VERIFYING A MINIMUM TORQUE VALUE

[75] Inventors: Kenneth D. Abramson, Bloomfield; Tetsuo Abe, Rochester Hills, both of Mich.

[73] Assignee: Sanyo Machine America Corporation, Rochester Hills, Mich.

[21] Appl. No.: 682,638

[22] Filed: Apr. 9, 1991

[51] Int. Cl.$^6$ ............................................. G01L 3/10
[52] U.S. Cl. ............................ 73/862.23; 73/862.338
[58] Field of Search .......... 73/862.23, 862.21, 862.22, 73/862.25, 862.29, 862.32, 862.33, 862.35, 1 C, 862.12, 862.325, 862.338

[56] References Cited

U.S. PATENT DOCUMENTS

| | | | |
|---|---|---|---|
| 3,603,144 | 9/1971 | Smith | 73/862.23 |
| 4,150,559 | 4/1979 | Levy | 73/1 C |
| 4,375,121 | 3/1983 | Sigmund | 73/862.23 |
| 4,995,145 | 2/1991 | Eshghy | 73/862.23 |

FOREIGN PATENT DOCUMENTS 2731090 1/1979 Germany ................ 73/862.23

*Primary Examiner*—Donald Woodiel
*Attorney, Agent, or Firm*—Weintraub, DuRoss & Brady

[57] ABSTRACT

A device for verifying or measuring a minimum value of a previously applied torque on a workpiece such as bolt, nut, etc., includes a motor, a reduction gear assembly, a torque transducer and a fastener engaging member, including a rotatably spindle. The motor causes the spindle to rotate. A torsion bar interposed the spindle and the motor absorbs the inertia of the motor when the motor is stopped to minimize torque overshoot, as well as taking up the rotation generated by the motor immediately upon engagement with a workpiece. An angle encoder senses any rotation of the workpiece caused by the rotation of the spindle. Any rotation of the workpiece means that the previously applied torque is below a minimum predetermined value.

14 Claims, 1 Drawing Sheet

DEVICE FOR VERIFYING A MINIMUM TORQUE VALUE

BACKGROUND OF THE INVENTION

1. Field of the Invention

The present invention pertains to torque verifying or measuring devices. More particularly, the present invention pertains to automated torque measuring devices. Even more particularly, the present invention concerns automated devices for verifying that an applied torque to a fastener is at a minimum value.

2. The Prior Art

The need for the measurement or verification of the torque which has been previously applied to nuts, bolts and other fastening devices is well known. This is especially true in the assembly of mass produced devices. As is well-known to the skilled artisan, if the torque applied to nut, bolt or other such rotatably mounted fastener is either inadequate or excessive, then serious consequences to any assembly employing such fasteners may be encountered. Thus, it is essential that the torque previously applied to a fastener be accurately measured and/or verified to assure that it is greater than a minimum value.

Heretofore, the prior art has proposed devices for measuring or checking the torque which has previously been applied to a fastener. Typically, such prior art devices include a motor, a torque transducer, a rotating spindle having a fastener engaging socket and a rotation sensor. In use, the motor and the spindle are used to apply a torque to the fastener to cause the fastener to start to rotate. The sensor detects or senses the commencement of rotation of the fastener and the torque transducer measures the applied torque thereat. As rotation of the fastener begins and is sensed, the motor is stopped. However, because of the inertia of the motor, the motor continues to rotate. This additional rotation is imparted to the spindle and to the fastener, causing an increase in applied torque to occur. This additional torque, called torque overshoot, causes, in some instances, excessive torque to be applied to the fastener; gives inaccurate applied torque checking, and, also, upsets the relationship between the components of the assembly with which the fastener is associated. The problems associated with any one of these consequences is readily apparent.

Thus, a major advance in the art would be provided by a torque verifying or checking device which minimizes torque overshoot and which, in operation, does not apply any further torque to the fastener being checked. As is subsequently detailed, the present invention achieves this.

SUMMARY OF THE INVENTION

In accordance with the present invention, there is provided a device to determine whether a torque which has previously been applied to a fastener or a workpiece achieves a minimum value of torque. The device hereof, generally, comprises:

(a) means for rotating a workpiece engaging member;

(b) means for sensing torque being applied to the workpiece;

(c) a torsion bar disposed intermediate the means for rotating and a workpiece engaging member;

(d) a workpiece engaging member; and (e) means for sensing rotation of the workpiece engaging member.

The device hereof applies a predetermined torque to a workpiece, such as a bolt, nut or the like. The predetermined torque is above a minimum acceptable value for the previously applied torque which is to be checked, but slightly below the expected actual previously applied torque.

The means for rotating, generally, comprises a motor having an output shaft and a reduction gear assembly. The output shaft extends from the motor to the reduction gear assembly. The reduction gear assembly has an output shaft which extends through the means for sensing torque being applied to the workpiece and is journalled into a shaft housing.

The means for sensing torque, generally, comprises a torque transducer which senses the actual applied torque. The torsion bar allows the rotor of the means for rotating to begin rotating, while simultaneously preventing the rotation from being transmitted to the workpiece. Likewise, the torsion bar is deployed to absorb the inertia or kinetic energy of the means for rotating which is present upon the stopping thereof. A first end of the torsion bar, also, is secured to the shaft housing at an opposite end thereof. The opposite end of the torsion bar is connected to a spindle via a coupling. The spindle comprises the workpiece engaging member. The coupling is interposed the torsion bar and the spindle.

A workpiece engaging socket is mounted onto the spindle and rotatingly engages a workpiece such as a bolt or the like.

The means for sensing rotation of the workpieces is disposed proximate the socket and, generally, comprises an angle encoder.

Means for signalling, associated with the means for sensing, emits a signal to indicate that the applied torque is below the minimum value. This occurs if the socket is able to rotate the workpiece.

For a more complete understanding of the present invention, reference is made to the following detailed description and accompanying drawing. In the drawing, like reference characters refer to like characters throughout the several views in which:

DESCRIPTION OF THE PREFERRED EMBODIMENT

Figure 1:
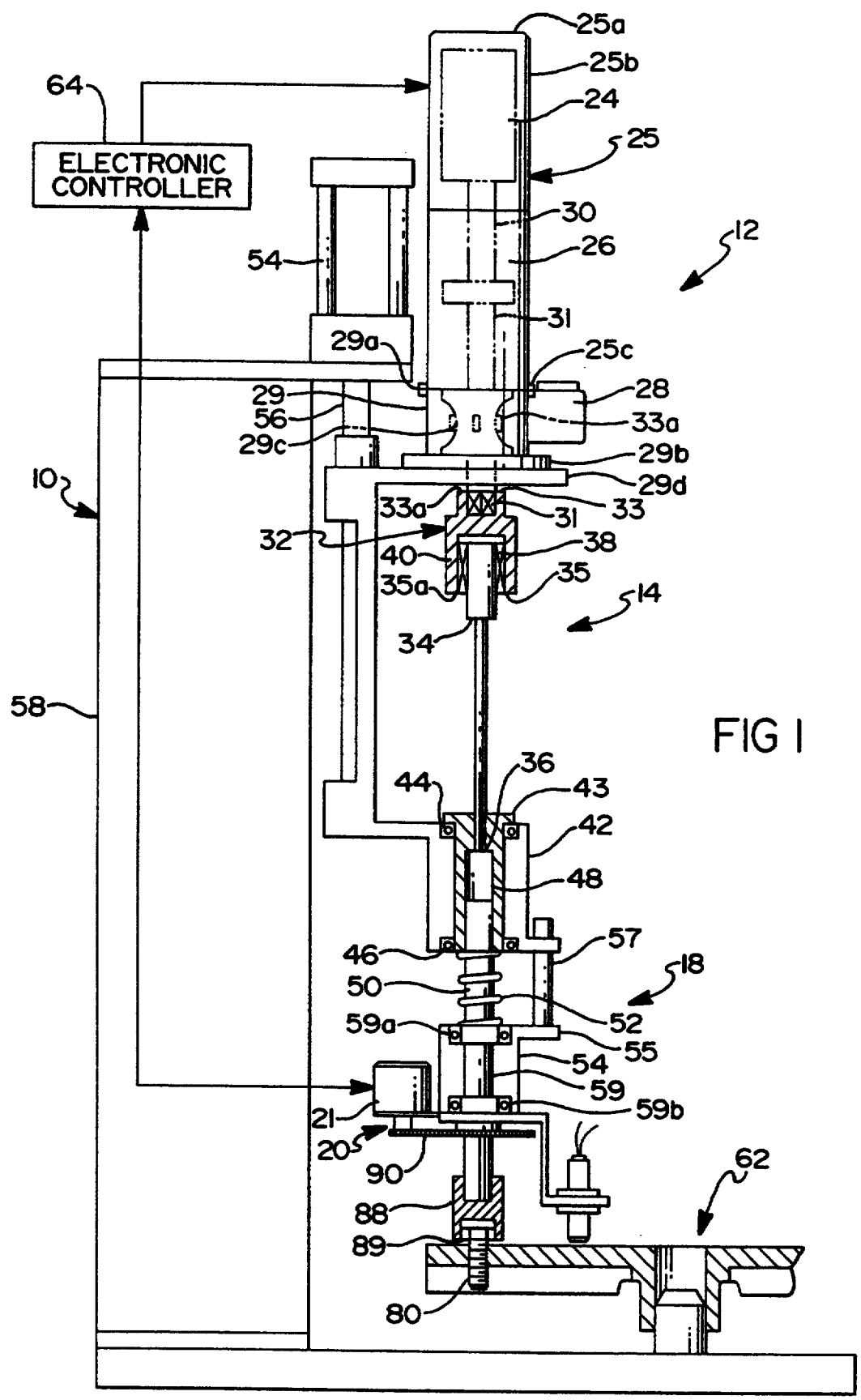
FIG. 1 is a side plan view, partially in schematic and partially in phantom, of the device of the present invention.

Now, and with reference to the drawing, there is depicted therein a device for verifying a minimum value of a torque which has been previously applied to a fastener and, generally, denoted at 10.

The device 10 hereof, generally, comprises:

(a) means for rotating a workpiece engaging member, generally denoted at 12;

(b) means for sensing torque being applied to the workpiece, and denoted at 28;

(c) a torsion bar 14;

(d) a workpiece engaging member 18; and (e) means for sensing rotation of the workpiece engaging member 18, generally denoted at 20.

In accordance herewith, and as shown in the drawing, the means for rotating 12 includes a DC motor 24 operatively connected to a source of power (not shown). Although it is preferred to employ a DC motor herein, other means such as an AC motor, a fluid operated motor or the like may optionally be employed.

A rotary output shaft 30 is connected to the motor 24 and rotates in response thereto in the well known manner. The shaft 30 extends from the motor 24 to a speed reduction gear assembly or gearbox, generally, denoted at 26.

The gearbox 26 functions to reduce the number of revolutions of the shaft 30 which would otherwise be imparted to a spindle of the workpiece engaging member 18. Thus, the gear box 26 enables the workpiece engaging member 18 to rotate at a lower speed. Optimally, the gearbox 26 comprises a planetary gear system of interlocking gears which operate to reduce the rotational speed of the output shaft 30 on an output member, such as an output shaft 31. The output shaft 31 extends from the gear box 26 to a torque transducer 28, as subsequently detailed.

As shown, the motor 24, the shaft 30 and the reduction gearbox 26 are disposed within a housing 25. The housing 25 includes a top wall 25a, a side wall 25b and a lower mounting flange 25c. Obviously, the side wall 25b could be provided with tapped bores or other means for mounting thereto. The wall 25b defines the stator for the motor 24.

The torque transducer 28 is a reaction torque transducer and is operatively connected to the reduction gear assembly 26 via the shaft 31. The reaction torque transducer 28 comprises a substantially cylindrical housing 29 having first and second opposed mounting ends 29a and 29b, respectively. The flanged end 29a mates with and is secured to the mounting end of flange 25c via suitable means, such as a threaded fastener or the like (not shown), to connect the housing 25 to the transducer 28.

The interior of the housing 29 has an enlarged diameter or "necked down" section 29c. Bonded strain gage elements 33a are circumferentially disposed about and are secured to the section 29c in any suitable fashion. The strain gage elements 33a sense the strain produced by the reaction torque which is being transmitted back to the housing 25.

The flanged end 29b of the housing 25 is secured or mounted to a static or stationary mounting plate 29d by any suitable means, such as threaded fasteners or the like, to provide a reference point for the gauge elements 33a. The mounting plate 29d is a component of a mounting frame 58, as shown, and as is subsequently detailed.

The reaction torque transducer transmits the reaction torque, which is equal in magnitude, but opposite in direction to the applied torque, back to the housing 25. It should be noted that the use of reaction torque transducers to sense applied torque is well known and such device are commercially available.

Although the torque transducer employed herein is, preferably, a reaction torque transducer, an in-line torque transducer can alternately be employed. In an in-line torque transducer, the diameter of the shaft is necked-down and the strain gages are circumferentially disposed about the shaft, per se, in the necked-down portion thereof. The in-line transducer already measures the applied torque, whereas the reaction transducer measures the reaction torque.

As shown in the drawing, the shaft 31 extends into and is operatively connected to a housing 32. The housing 32, also, transmits any torque or rotation imparted thereto to the torsion bar 14 via a one-way clutch 38, as explained below.

The housing 32 has a first end 33 and a second or opposite end 35. A bore is formed in the housing 32 at the first end 33. The shaft 31 has its free end fixedly journalled thereinto.

The opposite or second end 35 of the housing 32 defines a seat 35a for the one-way clutch 38 for the torsion bar 14.

The torsion bar 14 has a first end 34 and a second end 36. The first end 34 is journalled into a sleeve which seats within a collar 40. The collar 40 is fixedly disposed within the housing 32 via the bore or seat 35a formed therein. The collar 40 surrounds the sleeve and is frictionally engaged therewith. The sleeve and the collar 40, cooperate to define the one-way clutch 38 to prevent any reverse rotation of the torsion bar 14 upon stoppage of the motor. Thus, it is seen that both the shaft 31 and the torsion bar 14 are indirectly connected via the housing 32.

Preferably, the torsion bar 14 and the output shaft 31 are each a square rod, although cylindrical rods can be used.

As shown in the drawing, the torsion bar 14 has its second end 36 extending into a stationary bearing housing 42. The bearing housing 42 rotatably mounts the second end 36 of the torsion bar 14 therein. A central rotatable coupling 43 is fixed in the housing 42.

First and second or upper and lower bearings 44, 46 respectively, surround the coupling 43 to permit the rotation thereof.

The coupling 43 has a central partial bore 48 formed therein. The bore 48 defines a seating space or seat for the workpiece engaging member 18.

The workpiece engaging member 18, generally, comprises a rod or spindle 50 which extends from the central bore 48 of the bearing housing 42 to a workpiece 80.

the spindle 50 is, preferably, a square rod having its upper end seating in the bore 48 and its lower end secured to a socket 88 or other member.

Means, such as a spring 52 or the like, surrounds the spindle 50 at its uppermost end to normally urge the spindle toward the workpiece 80. A second bearing housing 54 is disposed intermediate the first housing 42 and the socket 88, as shown.

The second bearing housing 54 defines a fixed guide for the spindle 50. The housing 54 is a stationary member having a lateral mounting block 55 integrally formed therewith. A pin 57 has a first end fixed to the block 55 and extends to and is secured to the first housing 42, as shown.

The housing 54 is provided with a central bore 59 formed therethrough. The spindle 50 extends through the bore 59. A pair of spaced apart bearings 59a and 59b are disposed within the bore 59 and surround the spindle 50 to facilitate the rotation thereof.

The socket 88 is secured to the free end of the spindle 50 by any suitable means, such as a set screw or the like. Such securing means are well know to the skilled artisan. Likewise, The socket can be integrally formed with the spindle. The socket 88 has a lowermost end provided with a geometric recess 89 formed therein. The recess 89 is dimensioned and configured to engage the head of the workpiece 80 which is, generally, a fastener such as a bolt, nut or the like.

As shown in the drawing, means 20 for sensing the rotation of the socket, such as an angle encoder 21, is disposed on the spindle 50 proximate the socket 88. The encoder 21 comprises a timing belt and gear assembly 90 which engages and surrounds the spindle 50. The belt 90 is a notched or serrated member of well-known construction. The encoder 21 comprises a visual or optical pulsing device which receives pulses, if any, generated by the motion of the belt 90. The encoder 21, thus, senses any rotation of the fastener 80, by detecting electronic impulses generated by rotation of the belt 90 and the notches thereof passing by the optical sensor. Such encoders are well-known and commercially available.

In accordance herewith, and as shown in the drawing, linear actuator, which is preferably a fluid-operated cylinder 56, either pneumatic or hydraulic, is used to raise or lower the workpiece engaging member 18 into and out of engagement with the fastener 80. It should be noted that an electronic actuator (not shown) could be used equally as well. The housing 42 and 54 are secured to the cylinder, as shown.

Furthermore the assembly hereof is disposed upon a stand 58 and is mounted thereto for vertical motion or movement into and out of contact with a workpiece.

The present invention further includes a controller 64, preferably a programmable electronic controller, which is in electronic communication with the means 20 for sensing rotation, the means for sensing applied torque 28 as well as with the means for rotating 12. The controller is programmed such that it is urging or attempting to have the output shaft 30 of the motor 24 maintain a constant velocity even when a load is applied thereto. The controller, also, removes power from the motor and brakes the motor when the applied torque reaches a predetermined minimum value.

The controller may include a visual display or the like to enable ready visual detection. The strain gage elements of the torque transducer are electrically connected to the controller. The controller translates the strain value into a torque value. In use, the motor is actuated causing the spindle to rotate at a given, but low, r.p.m. While the spindle is rotating, the socket 88 is brought into engagement with the head of the fastener 80 and angular rotation of the fastener 80 is sensed by the means 20. Upon engagement between the socket and the head of the fastener "lockup" occurs. When "lockup" occurs, then, a continually increasing twist on the torsion bar 14 occurs due to the continuous increase in the torque generated by the motor as it attempts to maintain the constant velocity demands created by the controller. The twist on the torsion bar 14 prevents rotation of the shaft 31 from being transmitted to the workpiece. In essence, the torsion bar 14 functions to isolate the rotation of the output shaft 31 from the workpiece.

After the applied torque level reaches a predetermined level, the controller causes power to be removed from the motor and further causes the rotor of the motor to brake to a stop. This can be done either by reversing the motor or by dynamic braking, i.e., shorting the armature winding. As the motor brakes to a stop, the inertia of the motor is, then, absorbed by the torsion bar 14 to prevent torque overshoot, i.e., any additional rotation of the output shaft causes increased twist on the torsion bar 14. Likewise, the one way clutch 38 acts to prevent any counter-rotation of the torsion bar 14 until the spindle and socket 88 are disengaged from the head of the workpiece 80.

In accordance herewith and in a particularly preferred embodiment of the present invention, the torque verifying device hereof determines a minimum applied torque for a disc brake assembly workpiece, such as denoted at 62.

Herein, the workpiece has a torque applied to it from a previous work station or the like. The device hereof, thus, is used to determine or verify that the torque applied from the previous work station is above a predetermined minimum value. The controller is, therefore, programmed to a velocity for the shaft such that the motor will generate that minimum torque value. Thus, when the socket 88 engages the workpiece 80 head and lockup occurs, the load created as the motor 24 continues to rotate causes the motor to generate a continuously increasing torque, until the predetermined minimum value has been reached. If however, during this operation, any rotation of the fastener occurs, this is detected by the means for sensing. Likewise, if any such rotation does occur, then, this means that the applied torque is below the minimum value. Once rotation occurs and is detected, then, a means for signalling such as an alarm, (not shown) is sounded or otherwise activated, thereby indicating that the applied torque on the fastener is below the preset torque. The means for signalling is in electronic communication with the means for sensing rotation 20 and is responsive thereto, as hereinabove noted.

If, however, the minimum value is achieved, then, at the end of the cycle, and as explained hereinabove, the torsion bar 14 absorbs the inertia of the motor 24 as it is stopped, thereby reducing or minimizing any torque overshoot. This enables the minimum value to be verified to more closely approach the expected previously applied value.

It should be further noted with respect hereto that by absorbing the inertia of the motor 24 and, thus, minimizing any torque overshoot, any deviation of the preset angle between the fastener and the workpiece is likewise minimized. For example, since the fastener will not be rotated at all, absent an inadequate assembly, any parallelism or other angular relationship between the fastener 80 and the workpiece 62 is not impaired or otherwise deviated from.

It is to be further appreciated that the utilization of a torsion bar in any torque application enables the inertia of the motor to be compensated for and, thus, minimize any torque overshoot. Thus, the torsion bar can be used in not only verifying an applied torque but in any device which applies torque. Thus, the torsion bar can be effectively deployed in nutrunners and other fastening devices, as well as in other rotary fastener checking and measuring devices.

It is to be appreciated that there has been described herein a verification device which not only minimizes torque overshoot, but which does not further torque the fastener.

Having, thus, described the invention, what is claimed is:

1. A device for verifying a minimum value of a torque which has been applied to a workpiece, comprising:
   (a) a workpiece engaging member;
   (b) means for rotating the workpiece engaging member;
   (c) means for sensing torque being applied to the workpiece;
   (d) a torsion bar disposed intermediate the means for rotating and the workpiece engaging member;

(e) means for sensing any rotation of the workpiece after engagement with the workpiece engaging member; and (f) a one-way clutch interposed between the means for rotating and the torsion bar, the torsion bar having a first end secured to the clutch, the clutch preventing rotation of the torsion bar upon the stopping of the means for rotating; and wherein the torsion bar absorbs the inertia of the means for rotating upon the stopping thereof.

2. The device of claim 1, wherein the means for sensing any rotation comprises an angle encoder, the encoder disposed proximate a workpiece.

3. The device of claim 1 wherein the means for sensing torque comprises:

a torque transducer, the torque transducer being disposed intermediate the means for rotating and the torsion bar.

4. The device of claim 3 wherein the torque transducer is a reaction torque transducer.

5. The device of claim 3 wherein the torque transducer is an in-line torque transducer.

6. The device of claim 3 which further comprises:

means for normally urging the workpiece engaging member into engagement with the workpiece.

7. The device of claim 1 wherein the means for rotating comprises:

(a) a motor, the motor having a rotor and a stator, the stator defining a motor housing, (b) first output shaft operatively connected to the motor;

(c) a gear reduction assembly, the first output shaft being connected to the assembly, and (d) a second output shaft, the gear reduction second output shaft extending from the assembly to the means for sensing torque.

8. The device of claim 7 which further comprises:

(c) a torque transducer, the torque transducer defining the means for sensing torque;

(b) a stationary housing having a seat formed therein; and (c) wherein the second output shaft extends from the assembly through the torque transducer and is seated in the seat of the stationary housing.

9. The device of claim 8 wherein:

the stationary housing has a second seat formed therein, the second seat receiving a first end of the torsion bar.

10. The device of claim 1 which further comprises:

a pair of spaced apart bearing housings, the torsion bar having its second end secured to a first one of said pair of housings, the workpiece engaging member having a first end secured to the housing, the second housing defining a guide for the workpiece engaging member which extends from the first housing to the workpiece.

11. The device of claim 1 which further comprises:

(a) means for controlling the means for rotating;

(b) means for monitoring the means for sensing torque, and (c) means for monitoring the means for sensing rotation.

12. The device of claim 1 which further comprises:

means for signalling operatively connected to the means for sensing rotation, the means for signalling emitting a signal upon the sensing of any regular rotation of a workpiece.

13. The device of claim 1 which further comprises:

a stand, the device being mounted thereonto, the means for sensing torque being affixed to the stand, the stand defining a static reference base therefor.

14. The device of claim 11 wherein:

the means for controlling the means for rotating urges the means for rotating to rotate at a constant velocity.

* * * * *